US010640676B2

(12) United States Patent
Horiuchi

(10) Patent No.: US 10,640,676 B2
(45) Date of Patent: May 5, 2020

(54) RESIN COMPOSITION FOR HEAT-RESISTANT ELECTRIC WIRE AND HEAT-RESISTANT ELECTRIC WIRE

(71) Applicant: Yazaki Corporation, Tokyo (JP)

(72) Inventor: Yuki Horiuchi, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 551 days.

(21) Appl. No.: 13/803,957

(22) Filed: Mar. 14, 2013

(65) Prior Publication Data

US 2013/0203922 A1    Aug. 8, 2013

Related U.S. Application Data

(63) Continuation of application No. PCT/JP2011/066954, filed on Jul. 26, 2011.

(30) Foreign Application Priority Data

Oct. 8, 2010    (WO) .................. PCT/JP2010/067793

(51) Int. Cl.
| | | |
|---|---|---|
| C09D 171/00 | (2006.01) | |
| H01B 3/30 | (2006.01) | |
| H01B 7/29 | (2006.01) | |
| H01B 3/42 | (2006.01) | |
| H01B 3/44 | (2006.01) | |
| H01B 3/28 | (2006.01) | |

(52) U.S. Cl.
CPC ............. C09D 171/00 (2013.01); H01B 3/28 (2013.01); H01B 3/305 (2013.01); H01B 3/427 (2013.01); H01B 3/441 (2013.01); H01B 3/442 (2013.01); H01B 7/292 (2013.01)

(58) Field of Classification Search
CPC .................................................... C09D 171/00
USPC ........................................................ 524/508
See application file for complete search history.

(56) References Cited

U.S. PATENT DOCUMENTS

| | | | |
|---|---|---|---|
| 5,936,037 A | 8/1999 | Tasaka | |
| 6,180,251 B1 | 1/2001 | Kanai et al. | |
| 6,558,783 B1 | 5/2003 | Kato et al. | |
| 2002/0022686 A1 * | 2/2002 | Itoh et al. | ..................... 524/504 |
| 2003/0017223 A1 | 1/2003 | Tasaka et al. | |
| 2004/0030012 A1 | 2/2004 | Sato | |
| 2010/0212930 A1 | 8/2010 | Yasumoto et al. | |

FOREIGN PATENT DOCUMENTS

| | | | |
|---|---|---|---|
| CN | 1269382 A | 10/2000 | |
| CN | 1962739 A | 5/2007 | |
| CN | 101679870 A | 3/2010 | |
| DE | 69723890 T2 | 5/2004 | |
| EP | 0574 229 | * 8/1993 | |
| JP | 03-297011 A | 12/1991 | |
| JP | 08-283561 A | 10/1996 | |
| JP | 08-291250 A | 11/1996 | |
| JP | 11-189686 A | 7/1999 | |
| JP | 11-189690 A | 7/1999 | |
| JP | 2008-169234 A | 7/2008 | |
| JP | 2010-198898 A | 9/2010 | |

OTHER PUBLICATIONS

International Search Report (PCT/ISA/210) dated Nov. 8, 2011, issued by the International Searching Authority in International Application No. PCT/JP2011/066954.
Written Opinion (PCT/ISA/237) dated Nov. 8, 2011, issued by the International Searching Authority in International Application No. PCT/JP2011/066954.
Office Action dated Jun. 2, 2014, issued by the Korean Intellectual Property Office in counterpart Korean Application No. 10-2013-7008955.
Communication dated May 23, 2016 issued by Korean Intellectual Property Tribunal in counterpart Korean Patent Application No. 10-2013-7008955.
Office Action, Issued by the State Intellectual Property Office of P.R. China, dated Oct. 22, 2014, in counterpart Chinese application No. 201180048730.3.
Office Action dated Dec. 19, 2014, issued by the Korean Intellectual Property Office in counterpart Korean Application No. 10-2013-7008955.
Office Action dated Sep. 21, 2017, by the Intellectual Property India in counterpart Indian Application No. 2573/CHENP/2013.
Communication dated Mar. 2, 2017 issued by the European Patent Office in counterpart European Patent Application No. 11830424.5.

* cited by examiner

*Primary Examiner* — Deve V Hall
(74) *Attorney, Agent, or Firm* — Sughrue Mion, PLLC

(57) ABSTRACT

The present invention provides: a resin composition for a heat-resistant electric wire, containing from 25 to 60 parts by weight of a polyphenylene ether, from 15 to 42 parts by weight of a polypropylene-based resin, from 8 to 27 parts by weight of a styrene-based elastomer, from 5 to 15 parts by weight of a polyamide, and from 1 to 10 parts by weight of an acid-modified polyolefin, in which the polyamide has a melting point of 201° C. or more; and a heat-resistant electric wire using the composition.

8 Claims, No Drawings

RESIN COMPOSITION FOR HEAT-RESISTANT ELECTRIC WIRE AND HEAT-RESISTANT ELECTRIC WIRE

CROSS REFERENCE TO RELATED APPLICATIONS

This is a continuation of International Application No. PCT/JP2011/066954 filed Jul. 26, 2011, which claims priority from International Application No. PCT/JP2010/067793 filed Oct. 8, 2010, the contents of all of which are incorporated herein by reference.

TECHNICAL FIELD

The present invention relates to a resin composition for a heat-resistant electric wire that is excellent in the oil resistance, chemical resistance, heat resistance and impact resistance and utilized in the fields of electricity, automobiles and other various industrial materials, and particularly relates to a heat-resistant electric wire usable in automotive applications.

BACKGROUND ART

Conventional insulator materials for heat-resistant low-voltage automotive cables have a problem that sufficient heat resistance is not obtained unless a crosslinking treatment by electron beam irradiation is performed after extrusion molding of the coating layer and therefore, not only an expensive electron beam irradiation apparatus is necessary but also an electron beam irradiation step is required, resulting in low productivity.

In recent years, a resin composition for a non-crosslinked heat-resistant electric wire, using a polyphenylene ether material excellent in the heat resistance and the like, has been developed. The polyphenylene ether is excellent in the mechanical characteristics, electrical characteristics, heat resistance, low-temperature characteristics, low water absorption rate and dimensional stability but is poor in the molding processability, impact resistance and organic solvent resistance. Heretofore, it has been proposed to blend a polystyrene, a polyolefin, a hydrogenated block copolymer and the like with a polyphenylene ether and thereby improve impact resistance, molding processability and organic solvent resistance, which are problems for the polyphenylene ether (Patent Document 1).

BACKGROUND ART DOCUMENT

Patent Document

Patent Document 1: JP-A-11-189690 (the term "JP-A" as used herein means an "unexamined published Japanese patent application")

SUMMARY OF INVENTION

Problem that Invention is to Solve

However, in these conventionally known techniques, the polyphenylene ether is blended in a large amount so as to satisfy high-temperature melt resistance characteristics in a non-crosslinked state and therefore, the initial tensile elongation is low as compared with the conventional electric wire crosslinked by electron beam irradiation. This is associated with a problem that the tensile elongation after thermal aging is also low and the thermal aging resistance is low.

An object of the present invention is to improve those conventional problems, that is, provide a resin composition for a heat-resistant electric wire, having high thermal aging resistance and at the same time, being excellent in both high-temperature melt resistance characteristics and battery fluid resistance, and a heat-resistant electric wire.

Means for Solving Problem

As a result of intensive studies in consideration of the above-described object, the present inventors have found that when a polyamide and an acid-modified polyolefin are blended in specific amounts, a resin composition for a heat-resistant electric wire, having desired physical property values can be realized and in turn, a heat-resistant electric wire can be put into practical use.

That is, the present invention relates to a resin composition for a heat-resistant electric wire and a heat-resistant electric wire, in the following (1) to (4).

(1) A resin composition for a heat-resistant electric wire, comprising:
from 25 to 60 parts by weight of a polyphenylene ether;
from 15 to 42 parts by weight of a polypropylene-based resin;
from 8 to 27 parts by weight of a styrene-based elastomer;
from 5 to 15 parts by weight of a polyamide; and
from 1 to 10 parts by weight of an acid-modified polyolefin,
wherein the polyamide has a melting point of 201° C. or more.

(2) The resin composition for a heat-resistant electric wire as described in (1) above,
wherein the melting point of the polyamide is 220° C. or less.

(3) The resin composition for a heat-resistant electric wire as described in (1) or (2) above, comprising:
a bromine-based flame retardant in an amount of 8 to 20 parts by weight; or
a bromine-based flame retardant and a flame retardant aid in a total amount of 8 to 20 parts by weight.

(4) A heat-resistant electric wire, comprising:
a coating layer formed from the resin composition for a heat-resistant electric wire as described in any one of (1) to (3) above.

Effects of Invention

According to the present invention, a resin composition for a heat-resistant electric wire, having high-temperature melt resistance characteristics and at the same time, being excellent in both high thermal aging resistance and battery fluid resistance, and a heat-resistant electric wire using the composition can be provided.

MODE FOR CARRYING OUT THE INVENTION

The mode for carrying out the present invention is described in detail below.

The resin composition for a heat-resistant electric wire of the present invention (sometimes simply referred to as "resin composition of the present invention") contains a polyphenylene ether, a polypropylene-based resin, a styrene-based elastomer, a polyamide and an acid-modified polyolefin.

The polyphenylene ether contained in the resin composition of the present invention is a resin obtained by oxidative (co)polymerization of a phenol compound. The phenylene group may be substituted with an alkyl group, an aryl group, a halogen or the like.

Specific examples of the polyphenylene ether include a poly(2,6-dimethyl-1,4-phenylene ether), a poly(2,6-diethyl-1,4-phenylene ether), a poly(2-methyl-6-ethyl-1,4-phenylene ether), a poly(2-methyl-6-propyl-1,4-phenylene ether), a poly(2,6-dipropyl-1,4-phenylene ether), a poly(2-ethyl-6-propyl-1,4-phenylene ether), a poly(2,6-butyl-1,4-phenylene ether), a poly(2,6-dipropenyl-1,4-phenylene ether), a poly(2,6-dilauryl-1,4-phenylene ether), a poly(2,6-diphenyl-1,4-phenylene ether), a poly(2,6-dimethoxy-1,4-phenylene ether), a poly(2,6-diethoxy-1,4-phenylene ether), a poly(2-methoxy-6-ethoxy-1,4-phenylene ether), a poly(2-ethyl-6-stearyloxy-1,4-phenylene ether), a poly(2-methyl-6-phenyl-1,4-phenylene ether), a poly(2-methyl-1,4-phenylene ether), a poly(2-ethoxy-1,4-phenylene ether), a poly(3-methyl-6-tert-butyl-1,4-phenylene ether, a poly(2,6-dibenzyl-1,4-phenylene ether), and a copolymer containing a plurality of repeating units constituting such resins. One of these polyphenylene ethers may be used alone, or two or more thereof may be used in combination. Also, the polyphenylene ether is easily available as a general-purpose product and, for example, PX-100L produced by Mitsubishi Engineering-Plastics Corporation is preferred.

The polyphenylene ether for use in the present invention may be also a graft copolymer obtained by grafting a vinyl monomer, for example, a styrene-based compound such as styrene, α-methylstyrene and vinyltoluene, to the polymer above, and this graft copolymer is included in the polyphenylene ether according to the present invention.

The polyphenylene ether for use in the present invention is blended in the resin composition to account for 25 to 60 parts by weight, preferably from 30 to 50 parts by weight, more preferably from 30 to 40 parts by weight. If the blending amount is less than 25 parts by weight, the high-temperature melt resistance characteristics become insufficient, whereas if blended in excess of 60 parts by weight, inadequate thermal aging resistance results.

The polypropylene-based resin for use in the present invention includes, for example, a homopolymer, a block (co)polymer and a random (co)polymer, of a polypropylene. Specific examples thereof include a polymer obtained by polymerizing a monomer mainly composed of propylene, a propylene-ethylene random copolymer, a propylene-ethylene-α-olefin ternary copolymer, and a polypropylene-based block copolymer obtained through multiple stages including at least two or more stages for producing a polymer component obtained by polymerizing a monomer mainly composed of propylene and a copolymer component obtained by polymerizing propylene, ethylene and/or one or more monomers selected from α-olefins having from 4 to 10 carbon atoms. Examples of the α-olefin having a carbon number of 4 to 10 include 1-butene, 1-pentene, isobutylene, 3-methyl-1-butene, 1-hexene, 3,4-dimethyl-1-butene, 1-heptene and 3-methyl-1-hexene. One of these α-olefins may be used alone, or two or more thereof may be used in combination.

One of these polypropylene-based resins may be used alone, or two or more thereof may be used in combination. In addition, the polypropylene-based resin is not limited only to these resins and may be a polypropylene-based resin other than those described above as long as it does not go against the purpose of the present invention. Also, the polypropylene-based resin is easily available as a general-purpose product and, for example, B221WA, produced by Prime Polymer Co., Ltd. is preferred.

The polypropylene-based resin is blended to account for 15 to 42 parts by weight. If the blending amount is less than 15 parts by weight, inadequate thermal aging resistance results, whereas if blended in excess of 42 parts by weight, the high-temperature melt resistance characteristics and the like become insufficient.

The styrene-based elastomer is a polymer having a polystyrene chain at both terminals of the polymer chain and containing an elastomer chain therebetween. As the styrene monomer constituting the polystyrene chain, one or more monomers selected from the group consisting of styrene, α-methylstyrene and vinyltoluene are preferably used, and these are easily available in view of cost. As the monomer constituting the elastomer chain, one or more monomers selected from the group consisting of ethylene, propylene, butylene, isobutylene, butadiene, isoprene, 1-pentene and chloroprene are preferably used, and when these are used, control of the physical properties of the elastomer is facilitated.

In the styrene-based elastomer for use in the present invention, the ratio of styrene in 100 parts by weight of the elastomer is from 12 to 43 wt %, preferably from 15 to 30 wt %.

If the ratio of styrene is less than 12 wt %, the hardness or extrusion processability is reduced, whereas if it exceeds 43 wt %, the tensile elongation at break and flexibility are disadvantageously reduced.

Specific examples of the styrene-based elastomer for use in the present invention include a styrene-butadiene-styrene copolymer, a styrene-butadiene-butylene-styrene copolymer, a styrene-ethylene-butylene-styrene copolymer, a styrene-ethylene-propylene copolymer, a styrene-ethylene-propylene-styrene copolymer, and a styrene-ethylene-ethylene-propylene-styrene copolymer. Among these, a styrene-ethylene-butylene-styrene copolymer (available, for example, from Asahi Kasei Chemicals Corporation) that is a fully hydrogenated styrene-based elastomer, is preferred because of its good heat resistance. One of these styrene-based elastomers may be used alone, or two or more thereof may be used in combination. Also, the styrene-based elastomer is easily available as a general-purpose product and, for example, TUFTEC H1062 produced by Asahi Kasei Chemicals Corporation is preferred.

The styrene-based elastomer is blended to account for 8 to 27 parts by weight, preferably from 13 to 20 parts by weight. If the blending amount is less than 8 parts by weight, inadequate thermal aging resistance results, whereas if blended in excess of 27 parts by weight, the high-temperature melt resistance characteristics and the like become insufficient.

The polyamide for use in the resin composition of the present invention include, for example, a polymer obtained from a lactam, an aliphatic amino acid, a diamine and a dicarboxylic acid. Also, as the polyamide resin, a copolymerized polyamide where a slight amount of an aromatic component or another aliphatic component is introduced into the aliphatic component may be used. Examples of the aliphatic amino acid include 6-aminocaproic acid, 11-aminoundecanoic acid and 12-aminododecanoic acid, and one of these is used alone, or two or more thereof are used in combination. Examples of the lactam include ε-caprolactam and ω-laurolactam. Examples of the diamine include tetramethylenediamine, hexamethylenediamine, undecamethylenediamine, decamethylenediamine, m- or p-xylenediamine and dodecamethylenediamine, and one of these is used alone, or two or more thereof are used in combination. Examples of the dicarboxylic acid include an adipic acid, an azelaic acid, a sebacic acid, a cyclohexanedicarboxylic acid, a terephthalic acid, an isophthalic acid and a diglycolic acid, and one of these is used alone, or two or more thereof are used in combination.

The polyamide for use in the present invention must have a melting point of 201° C. or more. If the melting point is less than 201° C., the high-temperature melt resistance characteristics can be hardly obtained. Also, the polyamide preferably has a melting point of 220° C. or less. When the melting point is 220° C. or less, the thermal aging resistance is advantageously good.

Specific examples of the polyamide include polyamide 6, polyamide 66, polyamide 11, polyamide 12, polyamide 610, a copolymer of polyamide 6 and polyamide 66, and a copolymer of polyamide 6 and polyamide 12. Among others, polyamide 6 can be preferably used, because the melting point is close to the glass transition temperature of the polyphenylene ether, making it unnecessary to raise the processing temperature so as to melt the polyamide, and the thermal aging of the polypropylene-based resin or styrene-based elastomer can be suppressed. One of these polyamides may be used alone, or two or more thereof may be used in combination. As a polymer alloy of a polyphenylene ether resin and a polyamide resin, a general-purpose resin may be also used. Furthermore, the polyamide is easily available as a general-purpose product and, for example, UBE Nylon 1013A and UBE Nylon 7024B produced by Ube Industries, Ltd. are preferred.

The polyamide is blended to account for 5 to 15 parts by weight, preferably from 7 to 13 parts by weight. If the blending amount is less than 5 parts by weight, the high-temperature melt resistance characteristics and the like become insufficient, whereas if blended in excess of 15 parts by weight, inadequate thermal aging resistance results.

The acid-modified polyolefin for use in the resin composition of the present invention is a polyolefin having at least one functional group selected from the group consisting of a carboxylic acid group, a carboxylic acid metal salt group and an acid anhydride. Examples of the repeating unit constituting the olefin include propylene, ethylene, butene-1, hexene-1, and 4-methylpentene-1. Examples of the unsaturated carboxyl group-containing monomer as the acid modifier component include an acrylic acid, a maleic acid, a fumaric acid, an itaconic acid, a maleic acid monoester, a maleic acid diester, and metal salts thereof. Examples of the unsaturated carboxylic acid anhydride include a maleic anhydride and an itaconic anhydride.

Specific examples of the acid-modified polyolefin include an acrylic acid-modified polypropylene, a maleic acid-modified polypropylene and an itaconic acid-modified polypropylene. One of these acid-modified polyolefins may be used alone, or two or more thereof may be used in combination. Also, the acid-modified polyolefin is easily available as a general-purpose product and, for example, Umex 1010 produced by Sanyo Chemical Industries, Ltd. is preferred.

The acid-modified polyolefin is blended in the resin composition of the present invention to account for 1 to 10 parts by weight, preferably from 3 to 7 parts by weight. If the blending amount is less than 1 part by weight, the battery fluid resistance characteristics are insufficient, whereas if blended in excess of 10 parts by weight, inadequate thermal aging resistance results.

The resin composition of the present invention preferably further contains a bromine-based flame retardant. This can impart flame retardance. Examples of the bromine-based flame retardant include tetrabromobisphenol A, decabromodiphenyl ether, hexabromocyclododecane, bis(tetrabromophthalimide)ethane, TBBA carbonate.oligomer, TTBBA-bis(dibromopropyl ether), BBA epoxy.oligomer, brominated polystyrene, bis(pentabromophenyl)ethane, poly(dibromopropyl ether) and hexabromobenzene.

Furthermore, together with the bromine-based flame retardant, a flame retardant aid may be used in combination so as to increase the flame retardance. Examples of the flame retardant aid include antimony trioxide, antimony tetroxide, antimony pentoxide, zinc nitrate, zinc stannate and zinc sulfide.

In the resin composition of the present invention, the content of the bromine-based flame retardant or the total content of the bromine-based flame retardant and the flame retardant aid is preferably from 8 to 20 parts by weight. If the content is less than 8 parts by weight, the flame retardance is insufficient, whereas if blended in excess of 20 parts by weight, inadequate thermal aging resistance results.

Above all, the resin composition of the present invention is preferably a resin composition where the polyphenylene ether is a poly(2,6-dimethyl-1,4-phenylene ether), the polypropylene-based resin is a homopolymer of polypropylene, the styrene-based elastomer is a styrene-ethylene-butylene-styrene copolymer, the polyamide is polyamide 6 or a copolymer of polyamide 6 and polyamide 66, the acid-modified polyolefin is a maleic acid-modified polypropylene, and the total amount of the resins composed of these components is 100 parts by weight, and in this case, excellent physical properties as a coating material for a heat-resistant electric wire are ensured.

In the resin composition for a heat-resistant electric wire of the present invention, in addition to the above-described resin components, an antioxidant, a metal deactivator, other anti-aging agents, a lubricant, a filler, a reinforcing material, a UV absorber, a stabilizer, a plasticizer, a pigment, a dye, a coloring agent, an antistatic agent, a foaming agent and the like may be blended as long as the effects of the present invention are not inhibited.

Examples of the stabilizer include an antioxidant such as phosphorus-based compound, and a light stabilizer.

The resin composition for a heat-resistant electric wire of the present invention can be produced by various methods using the above-described components. The method includes, for example, a heat melt kneading method by a single-screw extruder, a twin-screw extruder, a roll, a kneader, Brabender Plastograph, a Banbury mixer or the like, and among others, a melt kneading method using a twin-screw extruder is most preferred. In this case, the melt kneading temperature is not particularly limited but is usually from 150 to 350° C.

The thus-obtained resin composition for a heat-resistant electric wire of the present invention is a resinous or elastomeric polymer composition and can be molded as a shaped body for a wide variety of components by various known methods such as injection molding, extrusion molding and hollow molding.

As to the wide variety of components, the shaped article can be also suitably used as interior and exterior parts of electrical equipment and specifically, the resin composition is suited for application in the parts such as cabinet of various computers, peripherals thereof, other office automation (OA) devices, televisions, videos, various disc players and the like and is further suited for application in the parts such as various gaskets, flexible tube, cable coatings, weather strips, flexible bumpers and cushion panels. In addition, the resin composition for a heat-resistant electric wire of the present invention is excellent in the oil resistance, thermal aging resistance, impact resistance, high-temperature melt resistance characteristics and battery fluid resistance and therefore, is suitable particularly as an automotive wire/cable coating material.

The resin composition of the present invention can be formed into an electric wire coating layer by extrusion molding, similarly to general resin compositions for electric wires. After the molding, a crosslinking step by the irradiation with an electronic beam or the like is not necessary.

Usually, the thickness of the electric wire coating layer formed by extrusion molding is preferably from 0.1 to 2.0 mm.

EXAMPLES

The present invention is described in greater detail below by the Examples, but the present invention is not limited only to these Examples.

Examples 1 to 5 and Comparative Examples 1 to 4

<Preparation of Resin Composition for Heat-Resistant Electric Wire>

Using the raw materials shown in Table 1, various components in the blending amounts (parts by weight) shown in Table 2 were melted and mixed at 270° C. in a twin-screw extruder to prepare a resin composition for a heat-resistant electric wire.

<Production of Coated Electric Wire>

The resin composition for a heat-resistant electric wire in each of Examples and Comparative Examples was used for the coating layer to obtain a coated electric wire.

That is, on a core wire (a wire obtained by twisting 19 wires) having a diameter of 0.15 mm, the resin composition was extrusion-molded by a single-screw extruder under the condition of 270° C. to form a coating layer having an outside diameter of 1.3 mm and a thickness of 0.25 mm, whereby a coated electric wire was obtained.

<Evaluation of Coated Electric Wire>

The coated electric wire obtained was evaluated for high-temperature melt resistance characteristics, battery fluid resistance, thermal aging resistance and light oil resistance.

1) Evaluation Method for High-Temperature Melt Resistance Characteristics

The high-temperature melt resistance was evaluated in accordance with JASO-618 (2008) as an indication of momentary heat resistance in an engine room, which is required of an automotive electric wire.

The coated electric wire obtained above was subjected to self-diameter winding and then heated at 200° C. for 30 minutes and after unwinding, whether or not the coating layers were fused to each other was examined. The high-temperature melt resistance was judged as high and rated "A" when fusion was not generated in the coating layer, and was judged as insufficient and rated "C" when fusion was generated.

2) Evaluation Method for Battery Fluid Resistance Characteristics

The battery fluid resistance characteristics were evaluated in accordance with ISO-6722 (2006) as an indication of acid resistance in an engine room, which is required of an automotive electric wire.

The coated electric wire obtained above was applied with a small amount of battery acid, then kept in an oven at 90° C. for 8 hours, taken out of the oven, again applied with the acid, kept in an oven at 90° C. for 16 hours (24 hours in total), and taken out of the oven. One cycle was thus completed. After repeating this procedure for two cycles in total, the electric wire was wound around a mandrel having a diameter of 6.5 mm, and the battery fluid resistance was judged as passed and rated "A" when the electric wire could withstand a voltage (1 kV×1 min), and was judged as failed and rated "C" when could not withstand.

3) Evaluation Method for Thermal Aging Resistance

The thermal aging resistance is an indication of mechanical characteristics of an automotive electric wire after 10 years in an engine room or after running of 100,000 km, and durability for 10,000 hours in an environment of 125° C. when routed directly above the engine or in an environment of 100° C. when routed around the engine is supposed to be sufficient. As an acceleration test thereof, a thermal aging resistance test at 140° C. for 2 hours was performed. Specifically, an insulator obtained by removing the conductor of the coated electric wire obtained above was kept in an oven at 140° C. for 2 hours, taken out of the oven and pulled at a rate of 200 mm/min. The thermal aging resistance was judged as high directly above the engine and rated "AA" when the elongation percentage was 150% or more, the thermal aging resistance was judged as high around the engine and rated "A" when from less than 150% to 120%, and the thermal aging resistance was judged as low when less than 120% and rated "C".

4) Evaluation Method for Light Oil Resistance

The light oil resistance was evaluated in accordance with ISO-6722 (2006) as an indication of oil resistance in an engine room, which is required of an automotive electric wire.

The coated electric wire obtained above was dipped in a mixed solution (No. 3 oil specified by ISO-1817: 90%, P-xylene: 10%) at 23° C. for 20 hours, and the percentage change in the outside diameter of the electric wire was measured. The light oil resistance was judged as passed and rated "A" when the percentage change was 15% or less, and was judged as failed and rated "C" when more than 15%.

Examples 6 to 11 and Comparative Examples 5 to 8

<Preparation of Resin Composition for Heat-Resistant Electric Wire>

Resin compositions for a heat-resistant electric wire were prepared in the same manner as in Example 1 by using the raw materials shown in Table 1 according to the blending amounts (parts by weight) shown in Table 3.

The coated electric wire obtained was evaluated for high-temperature melt resistance characteristics, battery fluid resistance, thermal aging resistance and light oil resistance in the same manner as in Example 1 and further evaluated for flame retardance as follows.

5) Evaluation Method for Flame Retardance

The coated electric wire was pulled obliquely at 45° with respect to the perpendicular direction in accordance with ISO-6722, and a reducing flame was contacted with the electric wire for 15 seconds. The flame retardance as an automotive electric wire was judged as adequate and rated "A" when the flame caught was extinguished within 70 seconds, and the flame retardance was judged as inadequate and rated "C" when not extinguished.

These evaluation results are shown in Tables 2 and 3.

It is seen from Table 2 that the heat-resistant electric wires according to Examples 1 to 5 of the present invention are a coated electric wire excellent in all evaluations of high-temperature melt resistance characteristics, battery fluid resistance characteristics, thermal aging resistance and light oil resistance. Furthermore, it is seen from Table 3 that the heat-resistant electric wires according to Examples 6 to 11 of the present invention further containing a bromine-based flame retardant and a flame retardant aid are a coated electric wire excellent also in the flame retardance, in addition to high-temperature melt resistance characteristics, battery fluid resistance characteristics, thermal aging resistance and light oil resistance.

On the other hand, it is revealed that the coating layers of the electric wires produced in Comparative Examples 1 to 8 are short of reaching the target value in any one evaluation item of high-temperature melt resistance characteristics, battery fluid resistance characteristics, thermal aging resistance and light oil resistance.

TABLE 1

List of Raw Materials Used in Heat-Resistant Resin Composition

| | |
|---|---|
| Polyphenylene ether A | PX-100L produced by Mitsubishi Engineering-Plastics Corporation |
| Polypropylene-based resin B | B221WA produced by Prime Polymer Co., Ltd. |
| Styrene-based resin elastomer C | TUFTEC H1062 produced by Asahi Kasei Chemicals Corporation |
| Polyamide D, PA6 (melting point: 225° C.) | AMILAN CM1046 produced by Toray Industries, Inc. |
| Polyamide E, PA6 (melting point: 220° C.) | UBE Nylon 1013A produced by Ube Industries, Ltd. |
| Polyamide F, PA6-12 (melting point: 201° C.) | UBE Nylon 7024B produced by Ube Industries, Ltd. |
| Polyamide G, PA6-66 (melting point: 196° C.) | DBE Nylon 5023B produced by Ube Industries, Ltd. |
| Acid-modified polyolefin H | Umex 1010 produced by Sanyo Chemical Industries, Ltd. |
| Bromine-based flame retardant | SAYTEX 8010 produced by Albemarle Corporation |
| Flame retardant aid | PATOX-M produced by Nihon Mining & Concentrating Co., Ltd. |

TABLE 2

Recipe for Coating Material and Test Results of Electric Wire

| | Example | | | | | Comparative Example | | | |
|---|---|---|---|---|---|---|---|---|---|
| | 1 | 2 | 3 | 4 | 5 | 1 | 2 | 3 | 4 |
| Polyphenylene ether A | 60 | 35 | 35 | 43 | 35 | 63 | 35 | 30 | 35 |
| Polypropylene-based resin B | 15 | 32 | 33 | 15 | 33 | 13 | 30 | 34 | 33 |
| Styrene-based elastomer C | 19 | 8 | 17 | 27 | 17 | 6 | 15 | 29 | 17 |
| Polyamide D | | | | | 10 | | | | |
| Polyamide E | 5 | 15 | | 10 | | | 6 | 20 | 3 |
| Polyamide F | | | 10 | | | | | | |
| Polyamide G | | | | | | 10 | | | |
| Acid-modified polyolefin H | 1 | 10 | 5 | 5 | 5 | 12 | 0 | 4 | 5 |
| Characteristics high-temperature melt resistance | A | A | A | A | A | A | A | C | C |
| Battery fluid resistance | A | A | A | A | A | A | C | A | A |
| Thermal aging resistance | AA | AA | AA | AA | A | C | AA | AA | AA |
| Light oil resistance | A | A | A | A | A | A | A | C | A |

TABLE 3

Recipe for Coating Material and Test Results of Electric Wire

| | Example | | | | | | Comparative Example | | | |
|---|---|---|---|---|---|---|---|---|---|---|
| | 6 | 7 | 8 | 9 | 10 | 11 | 5 | 6 | 7 | 8 |
| Polyphenylene ether A | 50 | 25 | 35 | 50 | 35 | 35 | 55 | 35 | 20 | 35 |
| Polypropylene-based resin B | 17 | 42 | 33 | 15 | 33 | 33 | 13 | 30 | 44 | 33 |
| Styrene-based elastomer C | 27 | 8 | 17 | 20 | 17 | 17 | 6 | 15 | 29 | 17 |
| Polyamide D | | | | | 10 | 10 | | | | |
| Polyamide E | 5 | 15 | | 10 | | | 14 | 20 | 3 | |
| Polyamide F | | | 10 | | | | | | | |
| Polyamide G | | | | | | | | | | 10 |
| Acid-modified polyolefin H | 1 | 10 | 5 | 5 | 5 | 5 | 12 | 0 | 4 | 5 |
| Bromine-based flame retardant | 6 | 6 | 6 | 6 | 6 | 15 | 6 | 6 | 6 | 6 |
| Flame retardant aid | 2 | 2 | 2 | 2 | 2 | 5 | 2 | 2 | 2 | 2 |
| Characteristics high-temperature melt resistance | A | A | A | A | A | A | A | A | C | C |
| Battery fluid resistance | A | A | A | A | A | A | A | C | A | A |
| Thermal aging resistance | AA | AA | AA | AA | A | A | C | AA | AA | AA |
| Light oil resistance | A | A | A | A | A | A | A | A | C | A |
| Flame retardance | A | A | A | A | A | A | A | A | A | A |

While the invention has been described in detail and with reference to specific embodiments thereof, it will be apparent to one skilled in the art that various changes and modifications can be made therein without departing from the spirit and scope of the invention. This application is based on International Application (PCT/JP2010/067793) filed on Oct. 8, 2010, the contents of which are incorporated herein by way of reference.

INDUSTRIAL APPLICABILITY

The resist composition for a heat-resistant electric wire of the present invention is a resin composition for a heat-resistant electric wire utilized in various industrial material fields and particularly, is expected to be utilized for electric wire applications requiring high-temperature melt resistance characteristics, battery fluid resistance and thermal aging resistance in airplanes, semiconductors, automobiles, OA devices, IT devices and the like.

The invention claimed is:
1. A resin composition for a heat-resistant electric wire, the resin composition comprising:
   from 25 to 60 parts by weight of a polyphenylene ether;
   from 15 to 42 parts by weight of a polypropylene-based resin;
   from 8 to 27 parts by weight of a styrene-based elastomer;
   from 5 to 15 parts by weight of a polyamide; and
   from 1 to 10 parts by weight of an acid-modified polyolefin,
   wherein the polyamide has a melting point of 201° C. or more, and
   wherein a sum of the polyphenylene ether, the polypropylene-based resin, the styrene-based elastomer, the polyamide, and the acid-modified polyolefin totals 100 parts by weight.
2. The resin composition for a heat-resistant electric wire according to claim 1, wherein the melting point of the polyamide is 220° C. or less.

3. The resin composition for a heat-resistant electric wire according to claim 1, further comprising:
    a bromine-based flame retardant in an amount of 8 to 20 parts by weight; or
    a bromine-based flame retardant and a flame retardant aid in a total amount of 8 to 20 parts by weight.

4. The resin composition for a heat-resistant electric wire according to claim 3,
    wherein the bromine-based flame retardant is selected from the group consisting of tetrabromobisphenol A, decabromodiphenyl ether, hexabromocyclododecane, bis(tetrabromophthalimide)ethane, TBBA carbonate•oligomer, TTBBA-bis(dibromopropyl ether), BBA epoxyoligomer, brominated polystyrene, bis(pentabromophenyl)ethane, poly(dibromopropyl ether) and hexabromobenzene.

5. The resin composition for a heat-resistant electric wire according to claim 3,
    wherein the flame retardant aid is selected from the group consisting of antimony trioxide, antimony tetroxide, antimony pentoxide, zinc nitrate, zinc stannate and zinc sulfide.

6. The resin composition for a heat-resistant electric wire according to claim 1,
    wherein the polyphenylene ether is a poly(2,6-dimethyl-1,4-phenylene ether), the polypropylene-based resin is a homopolymer of polypropylene, the styrene-based elastomer is a styrene-ethylene-butylene-styrene copolymer, the polyamide is polyamide 6 or a copolymer of polyamide 6 and polyamide 66, the acid-modified polyolefin is a maleic acid-modified polypropylene, and the total amount of the resins is 100 parts by weight.

7. A heat-resistant electric wire, comprising:
    a coating layer formed from the resin composition for a heat-resistant electric wire according to claim 1.

8. A method for producing a heat-resistant electric wire, comprising:
    forming a coating layer from the resin composition for a heat-resistant electric wire according to claim 1.

* * * * *